(12) United States Patent
Manzano et al.

(10) Patent No.: US 8,813,093 B2
(45) Date of Patent: Aug. 19, 2014

(54) INTEGRATION OF DISPARATE APPLICATIONS ON A NETWORK

(71) Applicant: Topia Technology, Tacoma, WA (US)

(72) Inventors: Mike R. Manzano, Seattle, WA (US); Jamie Paulson, Tacoma, WA (US); Chad Hardin, Lakewood, WA (US); Michael McGrady, Tacoma, WA (US)

(73) Assignee: Topia Technology, Inc., Tacoma, WA (US)

( * ) Notice: Subject to any disclaimer, the term of this patent is extended or adjusted under 35 U.S.C. 154(b) by 0 days.

(21) Appl. No.: 13/707,545

(22) Filed: Dec. 6, 2012

(65) Prior Publication Data

US 2013/0097617 A1 Apr. 18, 2013

Related U.S. Application Data

(63) Continuation of application No. 12/872,076, filed on Aug. 31, 2010, now abandoned, which is a continuation of application No. 11/739,085, filed on Apr. 23, 2007, now Pat. No. 7,805,732.

(60) Provisional application No. 60/754,354, filed on Apr. 21, 2006, provisional application No. 60/825,852, filed on Sep. 15, 2006.

(51) Int. Cl.
*G06F 9/44* (2006.01)
*G06F 15/16* (2006.01)

(52) U.S. Cl.
USPC .......................................... 719/317; 709/202

(58) Field of Classification Search
None
See application file for complete search history.

(56) References Cited

U.S. PATENT DOCUMENTS

| | | | | |
|---|---|---|---|---|
| 5,603,031 A | * | 2/1997 | White et al. | 719/317 |
| 5,768,506 A | * | 6/1998 | Randell | 709/202 |
| 5,826,020 A | * | 10/1998 | Randell | 709/202 |
| 6,065,039 A | * | 5/2000 | Paciorek | 709/202 |
| 6,233,601 B1 | * | 5/2001 | Walsh | 709/202 |
| 6,282,563 B1 | * | 8/2001 | Yamamoto et al. | 709/202 |
| 6,282,582 B1 | * | 8/2001 | Oshima et al. | 719/317 |
| 6,496,871 B1 | * | 12/2002 | Jagannathan et al. | 719/317 |
| 6,662,207 B2 | * | 12/2003 | Kawamura et al. | 709/202 |
| 6,668,271 B1 | * | 12/2003 | Wolff | 709/202 |
| 6,681,243 B1 | * | 1/2004 | Putzolu et al. | 709/202 |
| 6,691,151 B1 | * | 2/2004 | Cheyer et al. | 709/202 |
| 6,738,975 B1 | * | 5/2004 | Yee et al. | 719/310 |
| 6,816,880 B1 | * | 11/2004 | Strandberg et al. | 709/202 |
| 6,851,115 B1 | * | 2/2005 | Cheyer et al. | 719/317 |
| 6,859,931 B1 | * | 2/2005 | Cheyer et al. | 719/317 |
| 6,898,618 B1 | * | 5/2005 | Slaughter et al. | 709/203 |
| 7,016,966 B1 | * | 3/2006 | Saulpaugh et al. | 709/230 |
| 7,072,967 B1 | * | 7/2006 | Saulpaugh et al. | 709/229 |
| 7,080,221 B1 | * | 7/2006 | Todd et al. | 711/161 |
| 7,082,604 B2 | * | 7/2006 | Schneiderman | 718/100 |
| 7,200,848 B1 | * | 4/2007 | Slaughter et al. | 719/317 |
| 7,213,047 B2 | * | 5/2007 | Yeager et al. | 709/202 |
| 7,254,608 B2 | * | 8/2007 | Yeager et al. | 709/203 |

(Continued)

*Primary Examiner* — Van Nguyen
(74) *Attorney, Agent, or Firm* — Pillsbury Winthrop Shaw Pittman LLP

(57) ABSTRACT

A system implementable in a network including a plurality of electronic devices coupled to each other via a communication medium includes a consumer configured to advertise at least one characteristic of the consumer. The system further includes a producer configured to initiate the creation of an event-channel by a core services element and provide a service to the consumer based on the at least one characteristic.

17 Claims, 5 Drawing Sheets

(56) References Cited

U.S. PATENT DOCUMENTS

| | | | | |
|---|---|---|---|---|
| 7,328,243 B2* | 2/2008 | Yeager et al. | | 709/205 |
| 7,668,910 B2* | 2/2010 | Dinges et al. | | 709/204 |
| 7,805,732 B2* | 9/2010 | Manzano et al. | | 719/317 |
| 7,937,713 B2* | 5/2011 | Haager et al. | | 719/317 |
| 8,082,491 B1* | 12/2011 | Abdelaziz et al. | | 715/234 |
| 2002/0052913 A1* | 5/2002 | Yamada et al. | | 709/202 |
| 2002/0156641 A1* | 10/2002 | Kitajima | | 705/1 |
| 2004/0006589 A1* | 1/2004 | Maconi et al. | | 709/202 |
| 2004/0010590 A1* | 1/2004 | Manzano | | 709/224 |
| 2004/0088347 A1* | 5/2004 | Yeager et al. | | 709/202 |
| 2004/0205772 A1* | 10/2004 | Uszok et al. | | 719/317 |
| 2004/0210910 A1* | 10/2004 | Manzano | | 719/317 |
| 2006/0067209 A1* | 3/2006 | Sheehan et al. | | 370/216 |
| 2006/0225064 A1* | 10/2006 | Lee et al. | | 717/168 |
| 2007/0094675 A1* | 4/2007 | Ryan | | 719/330 |

\* cited by examiner

INTEGRATION OF DISPARATE APPLICATIONS ON A NETWORK

PRIORITY CLAIM

The present application is a continuation of U.S. application Ser. No. 12/872,076 filed Aug. 31, 2010, which is a continuation of U.S. application Ser. No. 11/739,085 filed Apr. 23, 2007, now U.S. Pat. No. 7,805,732 issued on Sep. 28, 2010, which claims priority from U.S. Provisional Application No. 60/745,354 filed Apr. 21, 2006 and U.S. Provisional Application No. 60/825,852 filed Sep. 15, 2006. All of the aforementioned applications are herein incorporated by reference.

BACKGROUND OF THE INVENTION

Because of limited availability of processing resources and applications, computer-network users must often rely on multiple network devices to accomplish a particular processing task. For example, data on a first network device may be required by a second network device, but in a different format and unit of measure. Because the first and second devices may lack sufficient processing resources and/or conversion applications, additional network devices may be required to complete the task. However, there is no guarantee that a network device having the required application will have sufficient processing resources, or vice versa.

Other problems with the prior art not described above can also be overcome using the teachings of embodiments of the present invention, as would be readily apparent to one of ordinary skill in the art after reading this disclosure.

SUMMARY OF THE INVENTION

In an embodiment of the invention, a system is implementable in a network including a plurality of electronic devices coupled to each other via a communication medium. The system includes a first mobile agent object executable on an electronic device of the plurality and operable to perform a first operation on a data set. A second mobile agent object is executable on an electronic device of the plurality and operable to perform a second operation on a data set. A composition object is operable to enable the first mobile agent object to provide the data set to the second mobile agent object if the first mobile agent object and second mobile agent object are executing on the same electronic device of the plurality. At least one bridging object is operable to enable the first mobile agent object to provide the data set to the second mobile agent object if the first mobile agent object and second mobile agent object are executing on different electronic devices of the plurality.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
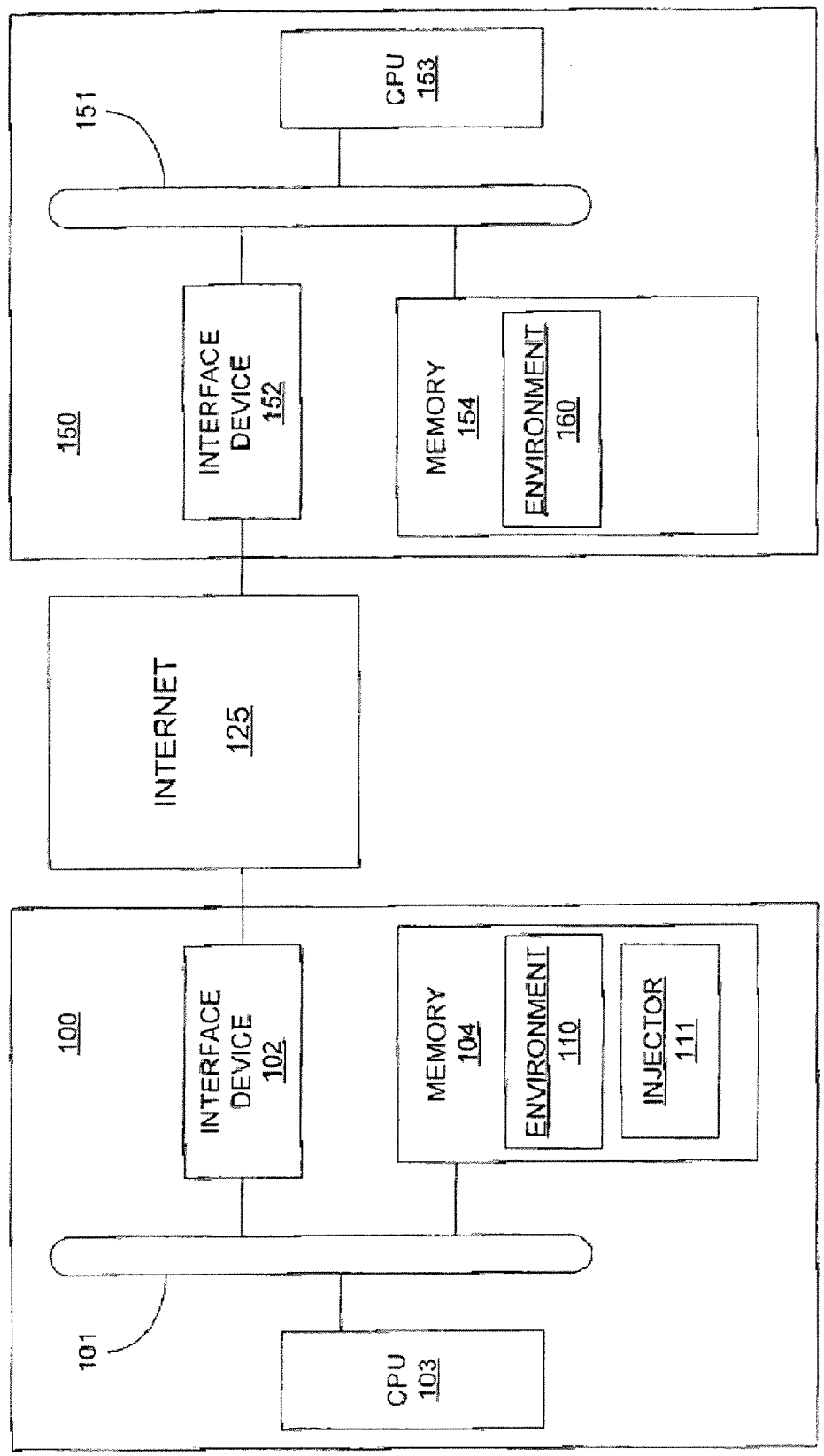
FIG. 1 is a schematic view of an exemplary operating environment in which an embodiment of the invention can be implemented.

Embodiments of the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Computing or other electronic devices described herein typically include at least some form of computer readable media. Computer readable media can be any available media that can be accessed by such computing devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

An embodiment of the invention leverages remote programming concepts by utilizing processes called mobile agents (sometimes referred to as mobile objects or agent objects). Generally speaking, these concepts provide the ability for an object (the mobile agent object) existing on a first ("host") computer system to transplant itself to a second ("remote host") computer system while preserving its current execution state. The operation of a mobile agent object is described briefly below.

The instructions of the mobile agent object, its preserved execution state, and other objects owned by the mobile agent object are packaged, or "encoded," to generate a string of data that is configured so that the string of data can be transported by all standard means of communication over a computer network. Once transported to the remote host, the string of data is decoded to generate a computer process, still called the mobile agent object, within the remote host system. The decoded mobile agent object includes those objects encoded as described above and remains in its preserved execution state. The remote host computer system resumes execution of the mobile agent object which is now operating in the remote host environment.

While now operating in the new environment, the instructions of the mobile agent object are executed by the remote host to perform operations of any complexity, including defining, creating, and manipulating data objects and interacting with other remote host computer objects.

An embodiment of the invention employs mobile objects to integrate disparate applications located on a network. It includes a framework upon which components (e.g., mobile-agent and other objects) may be built that handle the tasks required to successfully integrate applications that do not necessarily share a common interface and were deployed with no knowledge of each other. Exemplary components included in such integrations include ones responsible for protocol translation; data-type re-mapping; format, representation and unit conversion; data routing; and service name remapping.

As is discussed in further detail below, an embodiment of the invention integrates applications by allowing its users to specify and deploy "pipelines" that are composed of these components as the mechanism to provide such integration. An embodiment of the invention decouples the applications to be integrated—the integration occurs outside of the applications to be integrated. Further, since an embodiment of the invention takes care of the details, the applications do not need to know of each other's implementation, effectively decoupling them from each other. Additionally, an embodiment of the invention provides high reuse of conversion components—the components can be deployed and composed on remote platforms. As the components may be written to be generic, they can be used in more than one integration job.

FIG. 1 is a block diagram of a distributed-computing environment suitable for practicing embodiments of the invention. The distributed-computing environment includes a first computer system 100 and a second computer system 150 that are coupled by a network connection, such as the internet 125 as shown in FIG. 1. The network connection may be any other connection, such as a Local Area Network (LAN) for example, that is suitable for facilitating communication between computer systems. Here, the first 100 and second 150 computer systems may communicate over the internet 125 using a standard protocol, such as, for example, Transmission Control Protocol/Internet Protocol (TCP/IP). Additionally, there are typically many more computer systems (not shown) coupled with the internet 125, all of which may communicate with other computers on the network including the first and second computers 100 and 150.

The first computer system 100 includes a CPU 103 coupled to a bus 101 that facilitates communication between the CPU 103 and other components of the computer 100. Other components of the computer 100 include a Network Interface Component 102 (NIC) and a memory 104. The memory may include magnetic or optical disks, Random-Access memory (RAM), Read-Only memory (ROM), Basic Input/Output Systems (BIOS), or any other commonly known memory system used in computer architecture. In the first computer 100, a mobile-agent runtime environment 110 and a mobile agent injector program 111 are resident within the memory 104. Although shown as separate memory components, the mobile-agent runtime environment 110 and a mobile agent injector program 111 may reside in a single memory component or in any combination of memory components that are coupled with the bus 101. The NIC 102 facilitates communications between the first computer 100 and other computers, such as the second computer 150, via the internet 125.

The second computer 150 is similar to the first computer 100 and includes a CPU 153, a bus 151, a NIC 152, and a memory 154 which includes a mobile-agent runtime environment 160. These components are organized and coupled as described above with respect the first computer 100.

The above-described distributed-computing environment may host one or more mobile agent objects (not shown) that are present in one of the mobile-agent runtime environments 110 or 160 of one of the computers 100 or 150. The mobile-agent runtime environment 110 and 160 is a portion of the memory dedicated to allowing a mobile agent object the ability to perform operations that it was programmed to carry out.

Mobile agent objects may be instantiated in a mobile-agent runtime environment 110 or 160 in several ways, two of which are briefly described here. In a first way, the mobile agent object is locally created in the first computer 100 and then locally injected into the mobile-agent runtime environment 110 by the mobile agent injector program 111. In a second way, the mobile agent object moves from the mobile-agent runtime environment 110 of the first computer system 100 to the mobile-agent runtime environment 160 of the second computer system 150 over the internet 125 by its own accord, i.e., according to its programmed instructions.

Figure 2:
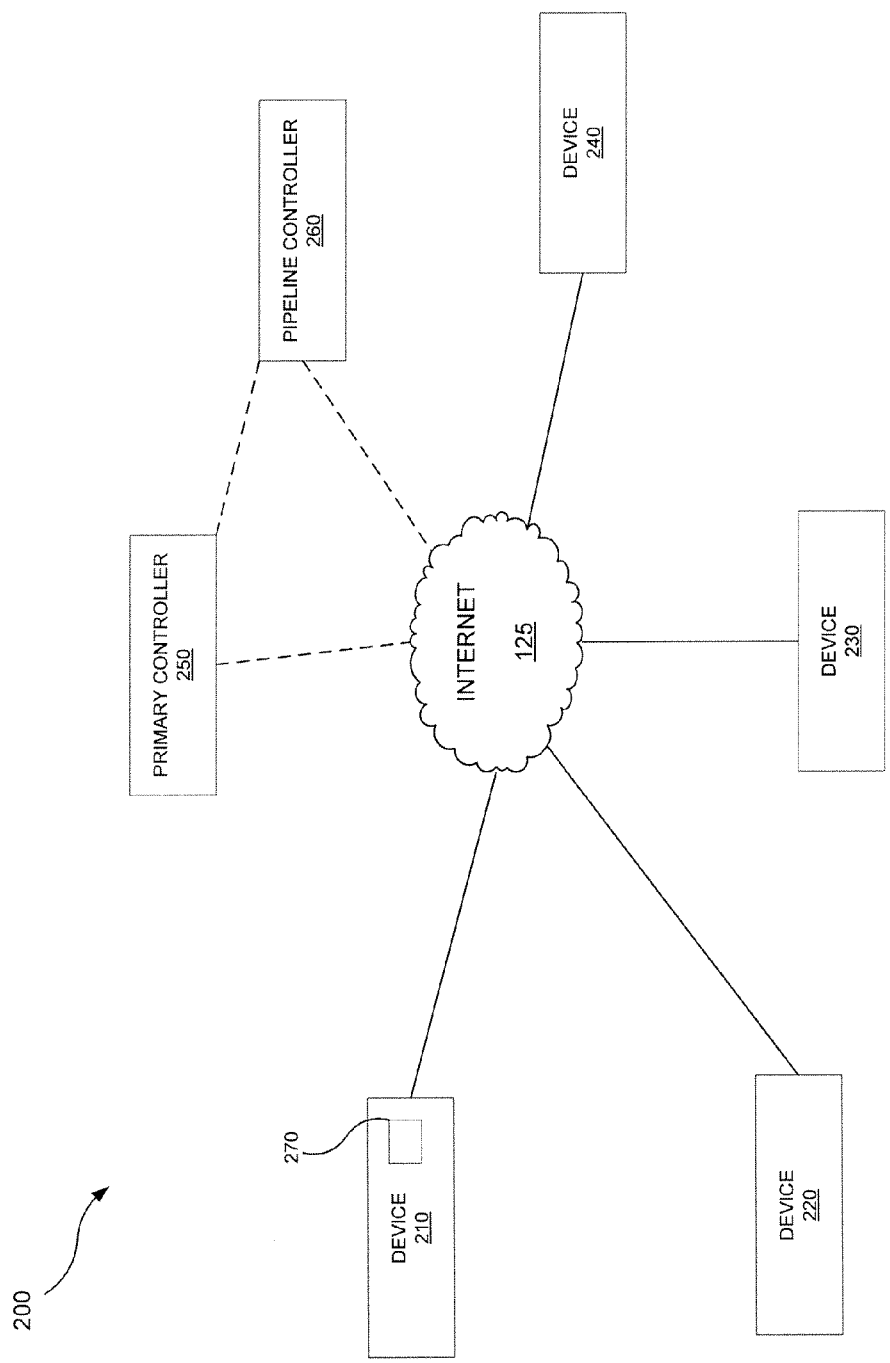
FIG. 2 is a functional block diagram of an exemplary operating environment in which an embodiment of the invention can be implemented.

Referring now to FIG. 2, embodiments of the present invention can be described in the context of an exemplary computer network system 200 as illustrated. System 200 includes electronic user devices 210, 220, 230, 240, such as personal computers or workstations, that are linked to each other via a communication medium, such as the Internet 125.

Each of the user devices 210, 220, 230, 240 may include all or fewer than all of the features associated with the computers 100 or 150 illustrated in and discussed with reference to FIG. 1. User devices 210, 220, 230, 240 can be used for various purposes including both network- and local-computing processes.

As alluded to above, an embodiment of the invention employs executable code in the form of objects, such as, for example, mobile agent objects and service objects, to optimize the use of resources made available by a network system, such as system 200. As such, a user of the system 200 may design and implement within the system a computational "pipeline" including such objects, each of which is programmed to perform a particular computational task. Each device (e.g., devices 210, 220, 230, 240) executing one or more of the objects in order to promote completion of the task may be referred to as a "node," and the pipeline may be thought of as one or more of such cooperating nodes.

For example, the user may wish to retrieve aircraft position data collected by device 210 for consumption ultimately by device 240. However, the device 240 may require the data to be in Cartesian coordinates and comma-separated-value format, whereas the data is collected by device 210 in polar coordinates and XML format. Moreover, neither of the devices 210, 240 may have processing resources and/or executable applications sufficient to perform the needed conversions, whereas the devices 220, 230 may have sufficient processing resources. Accordingly, the user may generate an instruction set that, when executed by one of the user devices or other device accessible to the system 200, functions to deploy a set of objects (and/or cause the objects to deploy themselves) among specified ones of user devices 210, 220, 230, and/or 240 to perform the desired data conversion and transfer. Such an instruction set may, for example, be an XML file constructed using a graphical user interface (not shown). Additionally, the pre-deployed objects may reside on any one of the user devices 210, 220, 230, 240 or other device accessible to the system 200.

Figure 3:
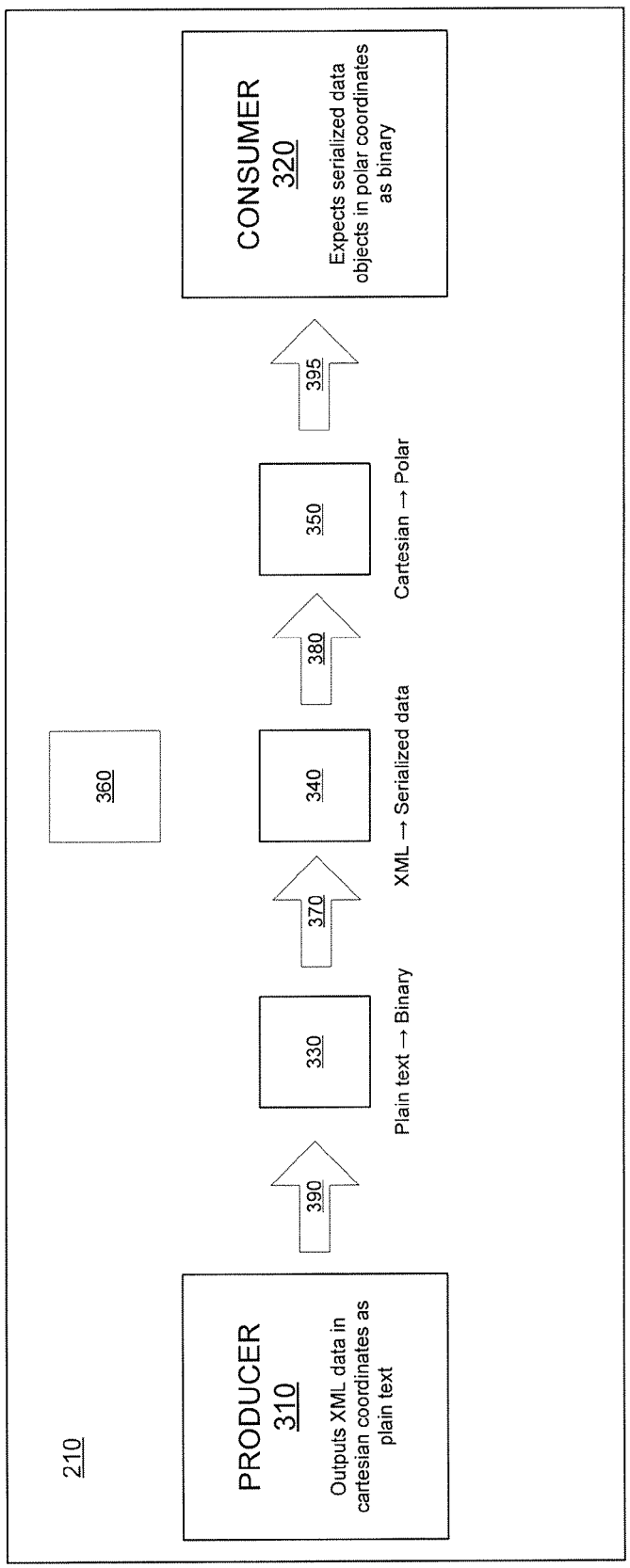
FIG. 3 is a functional block diagram illustrating an embodiment of the invention.
Figure 4:
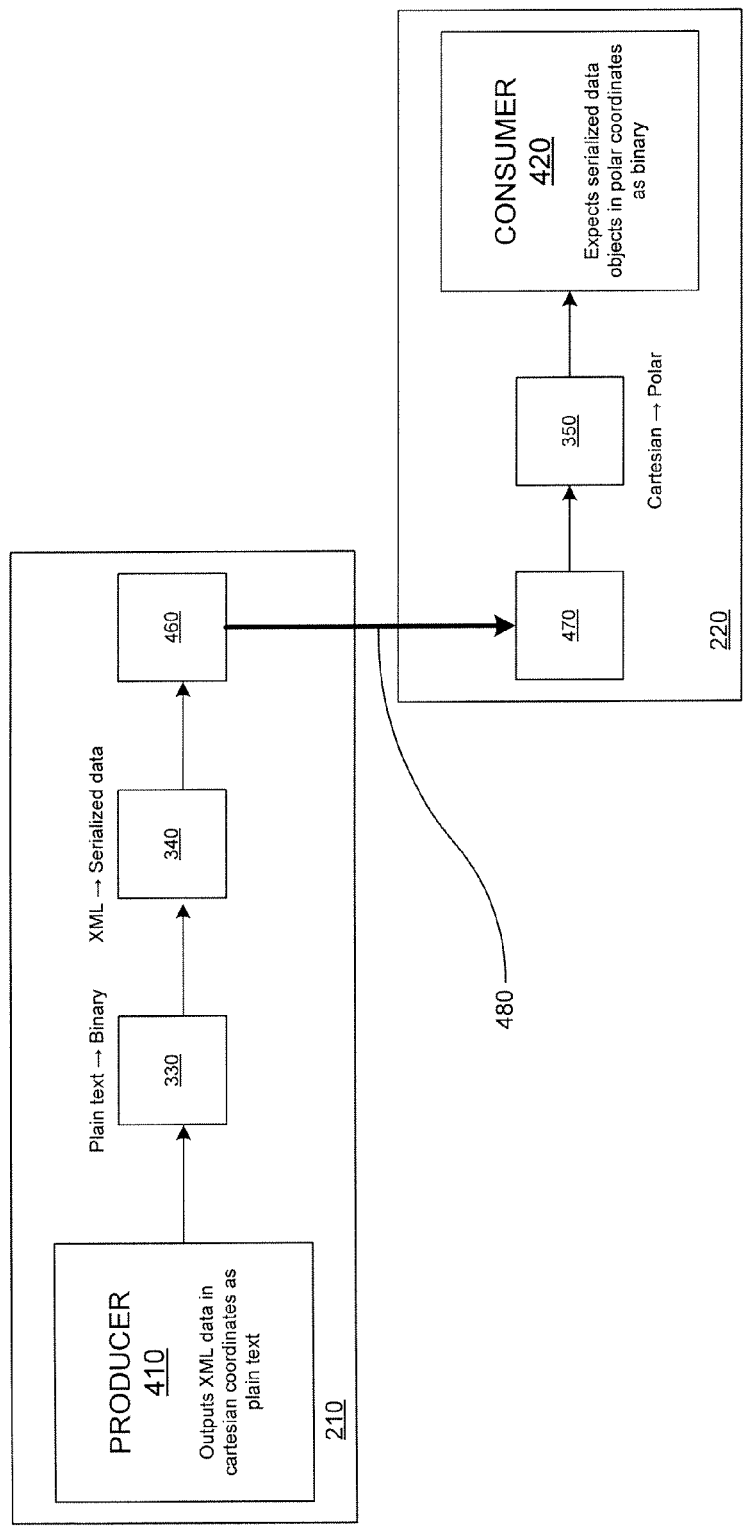
FIG. 4 is a functional block diagram illustrating an embodiment of the invention.

FIGS. 3-4 depict how components (e.g., mobile or service objects) might be composed to provide a specific functionality. Referring to FIG. 3, illustrated is an example of a single network device, such as device 210, on which have been deployed mobile objects 330, 340, 350 to perform a computational task. A set of one or more mobile objects deployed to a particular device may be called a "composition." Specifically, a data-producing application 310 executing on the device 210 outputs data to be utilized by a data-consuming application 320, also executing on the device 210. In the illustrated example, the application 310 outputs XML data in Cartesian coordinates as plain text. However, the application 320 expects serialized data objects in polar coordinates as binary. As such, the user of the system 200 has deployed mobile object 330, which converts plain text to binary, mobile object 340, which converts XML to serialized data, and mobile object 350, which converts Cartesian coordinates to polar coordinates, each of which take their respective turn in converting the data to its desirable final form.

In an embodiment, when multiple mobile objects are deployed to the same device, they communicate and send data to each other using a service object deployed and/or located on that device that may be called a composition service object ("Composition SO") described in greater detail below. As such, in the example illustrated in FIG. 3, a composition object 360 has also been deployed to the device 210, the service offered by which provides a communication interface 370 between mobile object 330 and mobile object 340, and a communication interface 380 between mobile object 340 and mobile object 350. In an embodiment, one or more composition objects (not shown) in addition to the composition object 360 provide one or more of the communication interfaces 370, 380. Additionally, objects, such as adapter components 390, 395 may be deployed to the device 210 to facilitate communication between respective applications and mobile objects. In an embodiment, adapter components interface directly with an application using that application's API.

Referring now to FIG. 4, as these mobile object components can be deployed to different machines on a network, it may be optionally advantageous to bridge between compositions. For example, as shown in FIG. 4, a data-producing application 410 may reside on the device 210, while a data-consuming application 420 may reside on the device 220. As a Composition SO may only interface components residing on the same device, another mechanism may be optionally advantageous to send data between compositions on different devices. Such bridging is done by mobile objects, called bridging components 460, 470, that know how to talk over the network and respective ones of which reside on the devices 210, 220. The bridging components 460, 470 are operable to form a composition bridge 480. For purposes of this disclosure, the bridging components 460, 470 and composition bridge 480 collectively may be referred to as a "bridging system."

To form a composition, components can bind to each other so that they can send each other data and control messages. A mechanism must exist for this binding to occur. The following are some optionally advantageous features of such a mechanism, called a Compositor:

1. The Compositor can provide a mechanism ("Sharing Mechanism") for a component to share data, whose size can be up to the maximum sharing size ("Maximum Sharing Size"), with another component.

2. The Compositor can provide a mechanism to configure the Maximum Sharing Size.

3. The Compositor's Sharing mechanism can allow a number ("Maximum Shared Data Items") of discrete data items to be shared.

4. The Compositor can provide a mechanism to configure the Maximum Shared Data Items.

5. The Compositor can provide a mechanism for components to send messages to another component.

6. The Compositor can provide a mechanism for message replies to be returned to a component that sent a message.

7. The Compositor can delegate compositional responsibility to the Bridging System when a component requests to share data with a component that is not on the same machine.

8. The Compositor can delegate compositional responsibility to the Bridging System when a component sends a message to a component that is not on the same machine.

These requirements may be met by a combination of the Composition SO and the Component base class. The interactions between these two entities that fulfill these requirements are described in Component Composition.

Objects bind to applications using adapter components. Adapter components interface directly with an application using that application's API.

In any pipeline there are typically adapters for producer applications, consumer applications, and intermediary services/applications.

As discussed above, components that wish to communicate with each other over a network can do so over a component bridge. This bridge may be put into place by the Bridging System whenever a request is made by a component to compose to another component that is remote to it (by either attempting to send it data or to send it a message).

Some features of the Bridging System are:

1 The Bridging System can provide a mechanism ("Sharing Bridge") that transfers data to a remote machine when a component on the remote machine accesses data through its local Sharing Mechanism that may be actually stored on the local machine's Sharing Mechanism.

2 The Bridging System can provide a mechanism ("Message Bridge") that transfers a message to a component on a remote machine when a local component sends a message addressed to that remote component.

3 The Bridging System can interface with other local components using the Compositor mechanism.

4 The Bridging System's Sharing Bridge functionality can be encapsulated into one or more mobile objects ("Sharing Bridge Component").

5 The Bridging System's Message Bridge functionality can be encapsulated into one or more mobile objects ("Message Bridge Component").

The design intended to meet these optional features contains the notion that the functionality required to do data and message transfer over the network may be itself implemented as a set of reusable mobile objects ("MOs").

Pipelines are the mechanisms provided by an embodiment of the invention to integrate a pair of applications that wish to communicate.

Referring back to FIG. 2, an embodiment of the invention uses three controller types for the management of pipelines:

Primary controller 250: Manages a set of pipelines. In an alternative embodiment, may reside on one of user devices 210, 220, 230, 240.

Pipeline controller 260: Manages a specific pipeline. In an alternative embodiment, may reside on one of user devices 210, 220, 230, 240. As indicated by the dashed lines in FIG. 2, the primary controller 250 and pipeline controller 260 may communicate with one another via the Internet 125 or via alternative communication medium.

Node Controller 270: Manages a section of a pipeline operating on a single network node, the node sometimes being referred to as a composition. May reside on one of user devices 210, 220, 230, 240, or other device (not shown) accessible to the system 200.

Pipelines may be tracked by an MO serving as the primary controller 250, the responsibilities of which may be twofold:

1. fully manage a set of pipelines. This responsibility includes pipeline deployment, deconstruction, maintenance, and fault detection.

2. track applications and the devices they run on that may be part (or can be part) of a pipeline. This task mainly involves tracking an application's availability. If availability changes, the pipeline may be affected in ways that require the primary controller 250 to take action.

Pipelines are complex entities in themselves, and can actually be composed of intermediate nodes. These intermediate nodes may be machines that contain objects (taking part in object compositions) that do some translation or mapping function optionally advantageous to the pipeline's integration job. These intermediary nodes may be also tracked by the primary controller 250.

A section of pipeline on a specific network node (also called a composition) may be controlled by an object called a node controller 270. Thus, each pipeline controller 260 controls a series of node controllers 270 that control the objects in a composition.

Each composition in one of the nodes in a pipeline may contain several MOs. These sets of MOs can contain one or more members (which can be input/output adapters, application adapters, or translators/filters/etc.) and a single routing controller (used within the composition for message routing between members, as defined in the compositor design).

The Node Controller 270 can be responsible for two primary tasks:

1. Ensuring that all of the MOs in its composition are still operating as expected.

2. Directing all of the MOs in its composition to migrate to a different node.

Some features of the Node Controller are:

1. The Node Controller can track MOs in its composition.

2. The Node Controller can detect failure of MOs in its composition.

3. The Node Controller can be capable of directing MOs in its composition to move to a different network node.

4. The Node Controller can provide a mechanism to determine the health of its composition.

5. The Node Controller can provide a mechanism to direct its composition to move.

Figure 5:
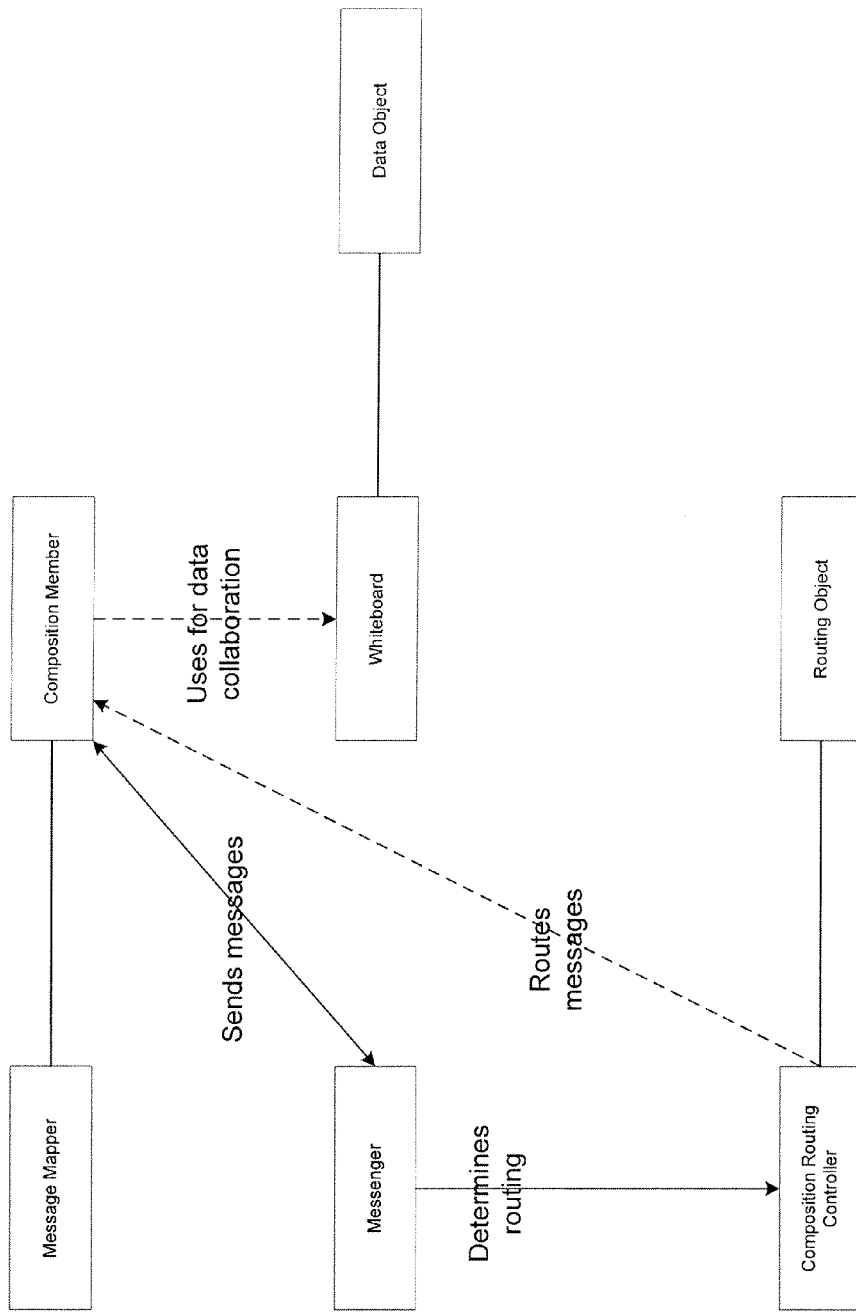
FIG. 5 is a functional block diagram illustrating features of an embodiment of the invention.

Referring now to FIG. 5, to form a composition, a section of a pipeline on a single network node, components (which are the MOs in a pipeline) can bind to each so that they can send each other data and control messages. The mechanism for this binding to occur may be called the Compositor.

Composition Members

"Composition Members" is a generic term for MOs that are part of a pipeline responsible for the collection, dissemination, manipulation, merging, and other associated tasks on data being processed by a pipeline.

Some features for generic Composition Member functionality are as follows:

1. Composition Members can be able to receive messages

2. Composition Members can be able to send messages

3. Composition Members can be able to place data on the Whiteboard

4. Composition Members can be able to manipulate Whiteboard data

5. Composition Members can be able to remove data from the Whiteboard

6. Composition Members can provide a mechanism to direct their migration

7. Composition Members can migrate when directed

8. Composition Members can provide a mechanism to map incoming messages to known message types Composition Members may be MOs that provide unique functionality, such as translation, filtering, merging, etc., of data. As such, the design for these provides a basic interface on which the design of specific Members can be based. The basic needed functionality is the need to accept incoming messages, map them to expected messages using a Message Mapper, and handle the messages accordingly (such as performing a translation and then sending a message to another MO). As such, all members may need to provide methods for delivery of messages, migration triggering, and setting up of the message mapper.

Composition Members when told to move can take appropriate data for messages they are currently handling with them to the destination system.

The following may be non-MO-featured public API methods, which can make up its interface class:

MOID getID( )

Returns the identifier for this object. Method is common to other MDCI MOs.

requestMove(destination)

Requests that this MO move. Data for this composition may be pulled from the whiteboard before migration, which can be replaced upon arrival at the destination node. Method is common to other MDCI MOs.

terminate( )

Requests that this MO terminate. Method is common to other MDCI MOs.

handleMessage(message)

Handles the specified message as appropriate for this object. Method is common to other MDCI MOs.

setMessageMapper(messageMapper)

Sets the message mapper to the specified mapper.

MessageMapper getMessageMapper( )

Retrieves the current message mapper.

Whiteboard

The Whiteboard may be the data storage and sharing mechanism within an MDCI composition.

Some features for the Whiteboard are as follows:

1. The Whiteboard can provide a mechanism to store data
2. The Whiteboard can provide a mechanism to access stored data
3. The Whiteboard can provide a mechanism to remove stored data
4. The Whiteboard can provide a mechanism to specify the maximum amount of data it can store
5. The Whiteboard can store no more than its maximum amount of data at any time
6. The Whiteboard can provide a mechanism to specify the maximum number of data items it can store
7. The Whiteboard can store no more than the maximum number of data items at any time The Whiteboard can be implemented as an SO (service object) that can be accessed by objects on the system. The main functionality can be the ability to put data on the whiteboard, get a reference to whiteboard data, and remove data from the whiteboard.

Data can be stored in an internal hash map that maps a data object identifier to its associated data object. The data object identifier may be generated when the object is put on the whiteboard and returned to the caller for use in referring to that object in the future.

Methods can be provided for specifying the maximum amount of data and maximum number of data objects, though reasonable defaults can be set in a static initializer.

Concurrency problems for the access of whiteboard data can need to be handled by the accessing object in this case.

The basic public API for the Whiteboard may be as follows:

DataObjectIdentifier putData(DataObject)

Puts a piece of data on the whiteboard and returns a locally unique identifier for that object. Throws an exception if the specified object is null or if the whiteboard is "full" (memory or number of objects).

DataObject getData (DataObjectIdentifier)

Retrieves a reference to a piece of data on the whiteboard that can be modified as needed by the caller, identified in the whiteboard by the specified identifier. Any modifications can synchronize on the object to prevent concurrency problems. Throws an exception if the specified identifier is null, or if there is no object stored for the given identifier.

DataObject removeData(DataObjectIdentifier)

Removes the piece of data from the whiteboard associated with the specified identifier, and returns the data object to the caller. Throws an exception if the specified identifier is null, or if there is no object stored for the given identifier.

void setMaximumDataSize(numberOfBytes)

Sets the maximum amount of memory the whiteboard can use.

void setMaximumDataObjects(numberOfObjects)

Sets the maximum number of data objects the whiteboard can use.

Data Objects

Data Objects are the discrete items to data that may be stored on the whiteboard. Each data object holds a discrete piece of data that can be modified in place as needed.

The features for Data Objects are as follows:

1. A Data Object can be capable of containing an arbitrary piece of data
2. A Data Object can provide a mechanism to set its data contents
3. A Data Object can provide a mechanism to modify its data contents Data Objects can basically be implemented as a container class for a generic Java Object, which represents its data. This allows the possibility of the internal data changing Class over the existence of the Data Object, so that as it is manipulated by Composition Members it is possible for the data to change.

Special note may need to be made by developers of Composition Members for the handling of Data Objects containing immutable objects such as Strings, ensuring that if they may need to re-set the data contents to actually change them.

The following may be the basic public API for Data Objects:

setData(Object data)

Sets the data contents. Exceptions for null value.

Object getData( )

Returns a reference to the data contents.

Composition Routing Controller

The Composition Routing Controller encapsulates information pertaining to the routing of messages between Composition Members. This facilitates the concept of who is "next" when a Composition Member performs a translation and wants to send a message to the next MO in its composition.

Some features for the Composition Routing Controller are as follows:

1. The Composition Routing Controller can provide a mechanism to specify the routing of Composition Member messages 2. The Composition Routing Controller can provide a mechanism to modify the routing of Composition Member messages
3. The Composition Routing Controller can provide a mechanism for Composition Members to send messages
4. The Composition Routing Controller can forward a message sent by a Composition Member to the next Composition Member(s) based on the defined routing
5 The Composition Routing Controller can provide a mechanism to direct its migration
6 The Composition Routing Controller can migrate as directed The Composition Routing Controller may be an MO that encapsulates the routing logic of messages between Composition Members (also MOs). Thus, it has associated with it a single Routing Object that defines that logic. Public methods allow the routing logic to be set or retrieved. Another public method, used by the messenger, queries for the receiver(s) of a given message based on the logic stored in the Routing Object.

The following are methods inherited from the MO base class, and can be part of the implementation of the Composition Routing Controller (not part of its interface class):

Created(Object[ ])

Called when the MO is created. The parameters in the object array may be a Routing Object and a destination IP/hostname.

State is set to CREATED.

Arrived( )

State is set to ARRIVED.

Run( )

If state is CREATED, move to destination system. If state is ARRIVED, register with Messenger and set state to ROUTING. If state is ROUTING, can loop indefinitely responding to routing requests from the Messenger until told to move or terminate (setting appropriate states at that time). If state is "MOVING", unregisters from the Messenger and moves to the destination. If state is TERMINATING, unregisters from the Messenger and exits the run method, which can cease MO execution.

The following are non-MO-required public API methods, which can make up its interface class:

MOID getID( )

Returns the identifier for this object. Method is common to other MDCI MOs.

requestMove(destination)

Requests that this MO move. Data for this composition may be pulled from the whiteboard before migration, which can be replaced upon arrival at the destination node. Method is common to other MDCI MOs.

terminate( )

Requests that this MO terminate. Method is common to other MDCI MOs.

handleMessage(message)

Handles the specified message as appropriate for this object. Method is common to other MDCI MOs.

setRoutingLogic(RoutingObject)

Sets the routing logic to that of the specified Routing Object

RoutingObject getRoutingLogic( )

Gets the routing logic, or null if none is defined.

downstreamMOList getDownstreamIDs(MOID)

Gets a list of downstream MOs for a specified ID. The Composition Routing Controller can retrieve this based on the contents of its Routing Object. An exception can be thrown if there is no logic for the specified MOID.

Messenger

The Messenger handles MO to MO messaging within a composition. This can be implemented as an SO that can handle the messaging of all compositions on the system.

Some features for the Messenger are as follows:

1. The Messenger can provide a mechanism to post a message for a specific MO instance 2. The Messenger can provide a mechanism for an MO to retrieve its messages 3. The Messenger can provide a mechanism to post a message for routing to a next MO 4. The Messenger can route messages based on the routing logic of the sending MO's Composition Routing Controller 5. The Messenger can notify the sender of failed message delivery The Messenger can be implemented primarily as an SO to allow use by multiple compositions operating on the same network node. As such, since it can be calling methods on both the Composition Routing Controller and Composition Members (which may be all MOs), they can need to register with the Messenger when arriving on the system and unregister when leaving. Aside from register/unregister methods, there can be two primary methods available for use by the MOs, one that routes a message based on the routing information provided by the Composition Routing Controller, and another that merely delivers a message to a specified destination. The first of these can be used by Composition Members for all of their messaging, while the latter can be used primarily by the Composition Routing Controllers for such tasks as directing members of its composition to migrate.

In order to prevent the crossing of threads between mobile object instances, the Messenger can have a separate object that it can use to carry out the task of actually sending messages to the destination. It can have a delegated "Message Sender" to which it can post a message and its recipient for delivery. The Message Sender can be implemented as a Messaging Thread that can wait for messages and post them as they are queued up for delivery by the Messenger.

The following presents the basic public API of the Messenger:

register(MO)

Registers the specified MO as being on the system. Stored in a map keyed by the ID of the MO, with the reference to the object available for later method calls. Throws an exception if the MO is already registered.

unregister(MOID)

Unregisters the specified MO from the system. The entry for the specified ID may be removed from the stored map. Throws an exception if the MO is not registered.

deliverMessage(MOID, message)

Delivers the specified message to the specified MO. The instance of the MO may be retrieved from the map based on the specified ID, and the message and destination may be given to the message sender for delivery. Throws an exception if the MOID is unknown.

routeMessage(ctlrID, message)

Sends the specified message to the appropriate MO based on the routing information in its Composition Routing Controller. The instance of the controller MO may be retrieved from the map based on the specified ID, and routing information may be retrieved from the controller. Routing destinations' MO instances may be then retrieved from the map, and the message sender may be called to deliver the message to each of the destination MOs. Throws an exception if the controller or destination MOIDs are unknown.

setMessageSender(messengeSender)

Sets the object that can actually be sending the messages.

Message Sender (Messaging Thread) Public API

The following presents the public API of the Message Sender, which can be implemented as a Messaging Thread:

sendMessage(recipientInstance, message)

Sends a message to the specified sender by calling its handleMessage( ) method. (In the case of a thread, this can happen indirectly by queuing up the message, which the thread can pull off and deliver in its run loop, but from the outside the behavior can be equivalent.)

Message Mapper

The Message Mapper allows a Composition Member to have a definition of how an incoming message type can be mapped to a possibly-dissimilar known message type. This allows for loose coupling of the interfaces exported by member MOs. The design paradigm can give each Composition Member its own Message Mapper to define its mappings.

Some features for the Message Mapper are as follows:

1. A Message Mapper can provide a mechanism to map an incoming message type to a message type supported by its owner.

2. A Message Mapper can provide a mechanism to define a mapping

3. A Message Mapper can provide a mechanism to change a mapping

4. A Message Mapper can provide a mechanism to remove a mapping

5. A Message Mapper can provide a mechanism to resolve an incoming message to a supported message type, appropriate to its mapping.

A Message Mapper may be tied closely to its owning Composition Member in that it maps incoming message types to message types expected by the Composition Member, and may be able to handle translation of these incoming messages. It can store a map in which incoming message type may be keyed to a value of the local supported message type. As such, it contains accessors for setting, removing, and retrieving a mapping. Also, it provides a method to resolve a mapping, so that its Composition Member can give it an incoming message, and the Message Mapper can modify the message as necessary to make it understandable based on its mappings, returning a modified message that can be handled by the Composition Member.

The following presents the basic public API of a Message Mapper:

setMapping(incomingMessageType, supportedMessageType)

Maps an incoming message type to a supported message type.

removeMapping(incomingMessageType)

Removes the mapping for the specified incoming message type. An exception may be thrown if there is no mapping for the specified type.

SupportedMessageType getMapping(incomingMessageType)

Returns the supported message type mapping for the specified incoming message type. An exception may be thrown if there is no mapping for the specified type.

SupportedMessage resolveMapping(incomingMessage)

Modifies an incoming message to its associated supported message type based on the mappings, and returns a message of the supported type. An exception may be thrown if there is no mapping for the incoming message type.

Routing Object

The Routing Object allows a Composition Routing Controller to have an object that encapsulates its routing logic. Each Composition Routing Controller can have its own Routing Object that can define this logic. By implementing this as an interface, it can be possible to have different types of routing logic for different compositions.

Some features for the Routing Object are as follows:

1. Routing Objects can provide a mechanism to define routing logic for what objects should receive a message based on its sender.

2. Routing Objects can provide a mechanism to add to routing logic

3. Routing Objects can provide a mechanism to change portions of routing logic

4. Routing Objects can provide a mechanism to remove portions of routing logic

5. Routing Objects can provide a mechanism to retrieve the receivers for a given sender Design The routing object may require a way to map IDs of Composition Members in a way that defines who is "next" given a sender. The implementation can be backed up by a Map, keyed by sender ID with a value of a list of receiver IDs. (This enables message delivery to multiple downstream Composition Members if desired.) Public accessors can be provided for adding new entries to the map, modifying map entries, removing map entries, and retrieving the "next" list for a given ID.

The following presents the basic public API of a Routing Object:

setNext(senderID, receiverID)

Specifies the message routing from one Composition Member to a single downstream Composition Member. This can replace any existing mappings for the specified sender ID.

setNext(senderID, receiverIDList)

Specifies the message routing from one Composition Member to a list of downstream Composition Members. This can replace any existing mappings for the specified sender ID.

addNext(senderID, receiverID)

Adds a single downstream Composition Member to the routing list of the specified sender Composition Member. Can throw an exception if there is no routing list for the sender or if the receiver is already in the routing list.

addNext(senderID, receiverIDList)

Adds a list of downstream Composition Members to the routing list of the specified sender Composition Member. Can throw an exception if there is no routing list for the sender or if any of the receivers are already in the routing list (in which case none of the receivers will be added to the list).

removeNext(senderID, receiverID)

Removes the specified downstream Composition Member from the routing list of the sender. Can throw an exception if there is no routing list for the sender or if the receiver is not in the routing list.

removeAllNext(senderID)

Removes the routing list for the sender completely. Can throw an exception if there is no routing list for the sender.

ReceiverIDList getNext(senderID)

Returns a list of receiver IDs representing the Composition Members in the downstream routing list of the specified sender. Can throw an exception if there is no routing list for the sender.

Each of the processes, systems and/or methods described herein is implementable in any suitable hardware, software, firmware, or combination thereof. To the extent such processes, systems and methods are implemented in computer-executable instructions, an embodiment of the invention includes the transfer of such instructions over a medium from one electronic device to at least one other electronic device.

While a preferred embodiment of the invention has been illustrated and described, as noted above, many changes can be made without departing from the spirit and scope of the invention. Instead, the invention should be determined entirely by reference to the claims that follow.

The embodiments of the invention in which an exclusive property or privilege is claimed are defined as follows:

1. A method of transferring at least one computer program product from at least one first computer to a second computer having a first object-oriented runtime environment and connected to the at least one first computer through at least one communication medium, and to a third computer having a second object-oriented runtime environment and connected to the at least one first computer through the at least one communication medium, the method comprising the steps of:
   (a) accessing, on the at least one first computer:
      (1) a consumer configured to advertise at least one characteristic of the consumer,
      (2) a producer configured to initiate the creation of an event-channel by a core services element, and provide a service to the consumer based on the at least one characteristic;
      (3) a first mobile agent object that, when executed in the first runtime environment, is configured to perform a first operation on a data set; and
      (4) a second mobile agent object that, when executed in the second runtime environment, is configured to perform a second operation on the data set,
      wherein the first mobile agent object receives the data set from the consumer, and the second mobile agent object provides the data set to the producer; and
   (b) instructing the transfer of the consumer to the second computer, and the producer to the third computer.

2. A non-transitory computer-readable medium having computer-executable instructions for performing the method of claim 1.

3. The method of claim 1, wherein the consumer comprises a data-consuming application configured to execute on the first computer.

4. The method of claim 1, wherein the producer comprises a data-producing application configured to output data to be utilized by the consumer.

5. The method of claim 1, wherein the first operation performed by the first mobile agent object comprises converting a first data type of the data set to a second data type.

6. The method of claim 1, wherein a communication interface links the first mobile object and the second mobile object.

7. The method of claim 1, wherein the first mobile object resides on a first device of the at least one first computer, and wherein the second mobile object resides on a second device of the at least one first computer.

8. The method of claim 7, wherein one or more of the first device and the second device comprises bridging components configured to communicate over a network.

9. The method of claim 1, wherein the first mobile object or the second mobile object comprise one or more of an input/output adapter, an application adapter, and a translator.

10. At least one non-transient computer-readable medium on which are stored executable instructions that, when executed by a processing device, enable the processing device to provide a system implementable in a network including a plurality of electronic devices coupled to each other via a communication medium, the system comprising:
a consumer configured to advertise at least one characteristic of the consumer;
a producer configured to initiate the creation of an event-channel by a core services element, and provide a service to the consumer based on the at least one characteristic;
a first mobile agent object that, when executed in a first runtime environment, is configured to perform a first operation on a data set; and
a second mobile agent object that, when executed in a second runtime environment, is configured to perform a second operation on the data set,
wherein the first mobile agent object receives the data set from the consumer, and
the second mobile agent object provides the data set to the producer.

11. The at least one non-transient computer-readable medium of claim 10, wherein the consumer of the system comprises a data-consuming application configured to execute on the first computer.

12. The at least one non-transient computer-readable medium of claim 10, wherein the producer of the system comprises a data-producing application configured to output data to be utilized by the consumer.

13. The at least one non-transient computer-readable medium of claim 10, wherein the first operation performed by the first mobile agent object comprises converting a first data type of the data set to a second data type.

14. The at least one non-transient computer-readable medium of claim 10, wherein a communication interface links the first mobile object and the second mobile object.

15. The at least one non-transient computer-readable medium of claim 10, wherein the first mobile object resides on a first device, and wherein the second mobile object resides on a second device.

16. The at least one non-transient computer-readable medium of claim 15, wherein one or more of the first device and the second device comprises bridging components configured to communicate over a network.

17. The at least one non-transient computer-readable medium of claim 16, wherein the producer resides on the first device, and wherein the consumer resides on the second device.

* * * * *